P. LASSEN.
ENGINE VALVE MECHANISM.
APPLICATION FILED JAN. 14, 1919.

1,426,486.

Patented Aug. 22, 1922.
2 SHEETS—SHEET 1.

Witnesses

Inventor
Peter Lassen
By Richard Lewin
Attorney

P. LASSEN.
ENGINE VALVE MECHANISM.
APPLICATION FILED JAN. 14, 1919.
1,426,486.
Patented Aug. 22, 1922.
2 SHEETS—SHEET 2.
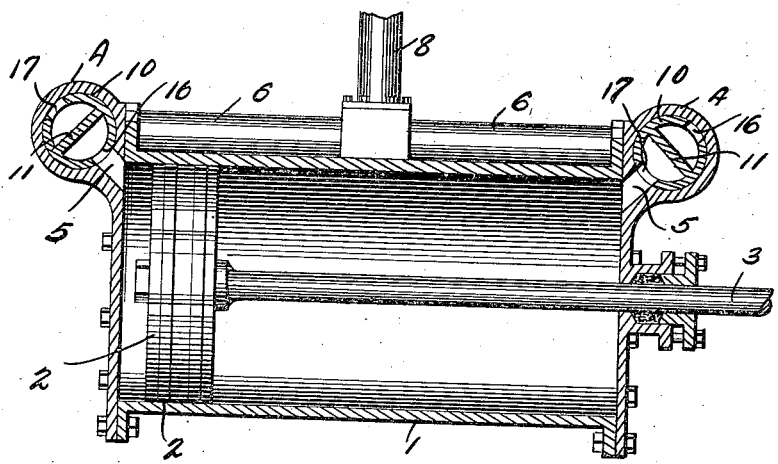
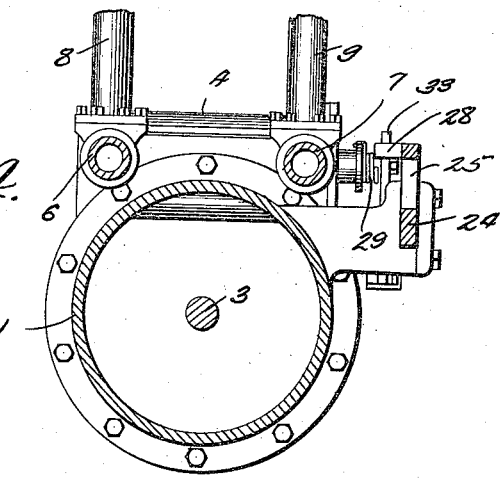
Witnesses
G. E. Walling
S. M. McColl
Inventor
Peter Lassen
By Richard Blewin,
Attorney

UNITED STATES PATENT OFFICE.

PETER LASSEN, OF OCEAN FALLS, BRITISH COLUMBIA, CANADA.

ENGINE VALVE MECHANISM.

1,426,486.　　　　　Specification of Letters Patent.　Patented Aug. 22, 1922.

Application filed January 14, 1919. Serial No. 271,093.

*To all whom it may concern:*

Be it known that I, PETER LASSEN, a subject of Germany, residing at Ocean Falls, in the Province of British Columbia and Dominion of Canada, have invented certain new and useful Improvements in Engine Valve Mechanism, of which the following is a specification.

This invention relates to engine valve mechanism, the object in view being to provide valve mechanism especially adapted for use in conjunction with a reciprocatory steam engine, the valve mechanism embodying cylindrical valve chambers and oscillatory valves working in said chambers and arranged at opposite ends or heads of the main cylinder of the engine, combined with means controlled from and actuated by the engine shaft for imparting the necessary movements to and properly timing said valves.

With the above and other objects in view, the invention consists in the construction, combination and arrangement of parts, as herein described, illustrated and claimed.

In the accompanying drawings:—

Fig. 3 is a vertical longitudinal section through the main cylinder of the engine extending transversely through the cylindrical valve chambers.

Fig. 4 is a transverse section taken on the line 4—4 of Fig. 1.

Figure 1:
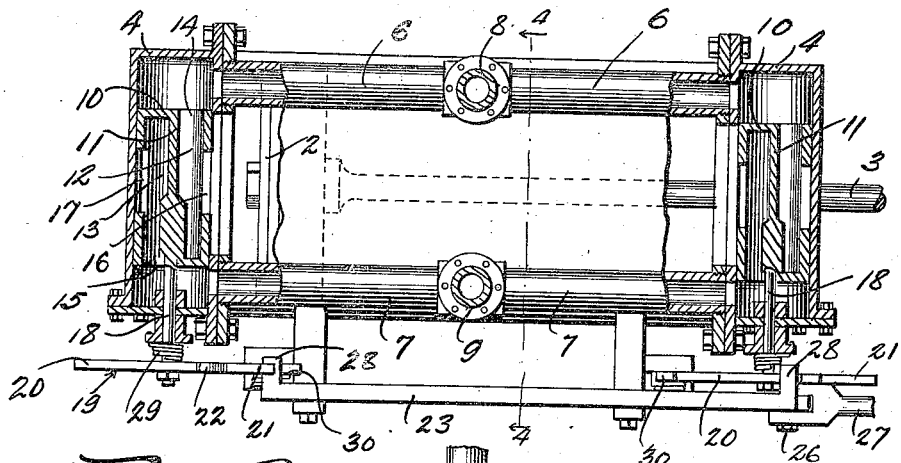
Figure 1 is a plan view partly in section of a steam engine, illustrating the improved valve mechanism.

In the embodiment illustrated, 1 designates the main cylinder of a steam engine, 2 the main piston mounted for reciprocatory movement in said cylinder, and 3 the piston rod, all of which are of usual construction. The invention comprises two cylindrical valve chambers 4 arranged at opposite ends of cylinder 1 perpendicular of the axis of said cylinder. The valve chambers 4 each communicate with one end of the cylinder 1 by means of a slot-like obliquely disposed port 5 which acts both as an inlet and exhaust port. Steam is led to and from the valve casings 4 by means of inlet and outlet pipes or conduits 6 and 7, respectively. The pipe 6 communicates with a steam supply pipe 8, and 9 represents an exhaust pipe which communicates with the outlet pipe or conduit 7. The pipes 6 and 7 communicate at their opposite extremities with the valve casings 4, as shown.

Figure 2:
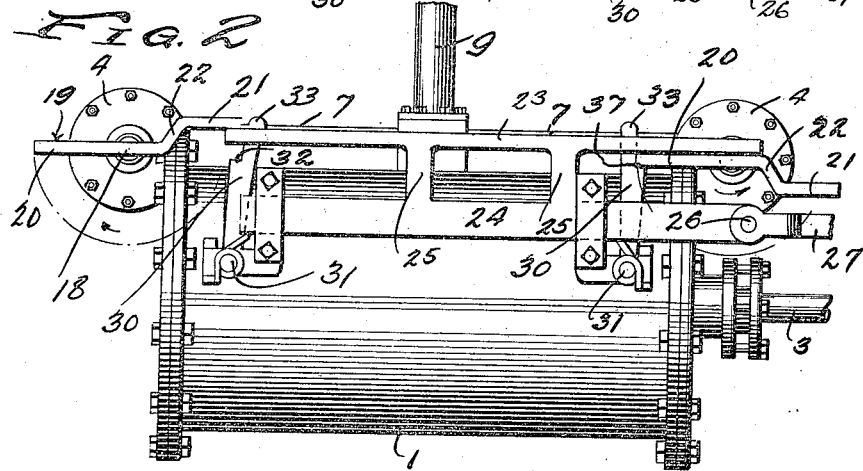
Fig. 2 is a side elevation of the same.

Mounted for oscillatory movement in each of the valve casings 4 is a hollow cylindrical valve 10 divided by a longitudinal partition 11 into an inlet chamber 12 and an exhaust chamber 13. This valve has openings 14 and 15 at its ends adapted to communicate with the pipes 6 and 7. This valve is provided also with a slot like inlet port 16 and a similarly shaped exhaust port 17 which are arranged in opposite sides of the valve and are adapted to alternately register with the cylinder 1. Each of the valves 10 has a stem or shaft 18 which extends through one end of its casing and fast on such projecting end is a cross bar 19 having a substantially straight arm 20 and another arm 21 having an offset 22 between the ends thereof as shown in Figure 2. Working in conjunction with and in co-operative relation to the bars 19 is a reciprocatory valve operating rod 23 which is arranged in spaced relation to a slide 24 to which it is fixedly connected by interposed spacing members or struts 25, the slide 24 being connected by a pivot 26 to what is usually known as the eccentric rod 27 of the engine, whereby reciprocatory motion is imparted to the slide 24 and therefore to the valve actuating rod 23. The rod 23 has laterally projecting trip fingers 28 which, in moving in one direction, act against the offset portions 22 of the cross arms 21 to turn the valve shafts 18 in one direction, said valve shafts being turned in the opposite direction by means of coil springs 29 which encircle said valve stems or shafts as shown in Figure 1. In conjunction with each of the cross bars 19, is employed a swinging trigger or stop 30 pivotally mounted at 31 on the engine frame. Each trigger has a shoulder 32 upon which one end of the adjacent cross bar 19 is adapted to rest when the operating arm 23 is withdrawn from under said cross arm. Each trigger is also provided with an upstanding finger 33 against which the corresponding trip finger 28 of the rod 23 is adapted to strike when said rod is shifted in one direction. The arrows in Figure 2 indicate the direction in which the bars 19 turn when tripped and actuated by the springs 29. These bars 19 are turned in the opposite direction by cooperation of the fingers 28 therewith, From the foregoing description, taken in connection with the accompanying drawings, it will be seen that the valve operating rod 23 is reciprocated by its connection with the crank shaft of the engine through rod 27. As the piston 2 moves toward one head of the cylinder 1, the dead steam in front of said piston is exhausted through the adjacent valve 4 and just before the stroke of the piston is completed, the rod 23 trips the bar 19 of the valve and the valve is quickly turned by means of its spring 29 to the inlet position. Live steam is then admitted to this end of the cylinder from which the dead steam has been exhausted and acts to drive the piston in the reverse direction, exhaust taking place through the valve at the opposite end of the cylinder, until the piston nearly reaches the end of that stroke when the valve at that end of the cylinder is quickly reversed by the action of its spring which is brought into operation by tripping of bar 19 by rod 23, and thereupon performs the function of a steam inlet valve. The valve operating rod 23 thus acts to set the valves in exhausting position and to trip the bars 19, so that the springs 29 may turn the valves to a steam admitting position.

From the foregoing description, taken in connection with the accompanying drawings, the advantages of the construction and of the method of operation will be readily apparent to those skilled in the art to which the inventon appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. In a reciprocatory engine, the combination with an engine cylinder and crank shaft, of valve cylinders, hollow cylindrical valves mounted for oscillatory movement in said valve cylinders, cross arms fast on the stems of said valves, a reciprocatory valve operating rod driven by the engine shaft, springs for turning said valves in one direction, and triggers co-operating with said cross arms to hold the respective valves in one position, said triggers being adapted to be shifted by said operating rod to release said cross arms.

2. In a reciprocatory engine, the combination with an engine cylinder and crank shaft, of valve cylinders perpendicular to the axis of said cylinder, hollow cylindrical valves mounted for oscillatory movement in said valve cylinders, cross arms fast on the stems of said valves, a reciprocatory valve operating rod movable in a plane parallel to the piston movement and driven by the engine shaft, springs for turning said valves in one direction, triggers co-operating with said cross arms to hold the respective valves in a predetermined position, and fingers on said operating rod adapted to engage said cross arms to turn the valves in one direction and also adapted to trip said trigger to release the cross arms and permit the springs to turn the valves in the opposite direction.

In testimony whereof I affix my signature in presence of two witnesses.

PETER LASSEN.

Witnesses:
K. M. GILLSON.
M. C. QUIGLEY.